April 2, 1957  A. NOVICK  2,787,468
DELIVERY MECHANISM FOR ENVELOPE MAKING MACHINES
Filed April 25, 1956  10 Sheets-Sheet 1

INVENTOR
Abraham Novick
BY
ATTORNEYS

April 2, 1957 A. NOVICK 2,787,468
DELIVERY MECHANISM FOR ENVELOPE MAKING MACHINES
Filed April 25, 1956 10 Sheets-Sheet 3

INVENTOR.
Abraham Novick
BY
ATTORNEYS

INVENTOR.
Abraham Novick

April 2, 1957            A. NOVICK            2,787,468

DELIVERY MECHANISM FOR ENVELOPE MAKING MACHINES

Filed April 25, 1956            10 Sheets-Sheet 5

INVENTOR
Abraham Novick
BY
ATTORNEYS

April 2, 1957  A. NOVICK  2,787,468
DELIVERY MECHANISM FOR ENVELOPE MAKING MACHINES
Filed April 25, 1956  10 Sheets-Sheet 6
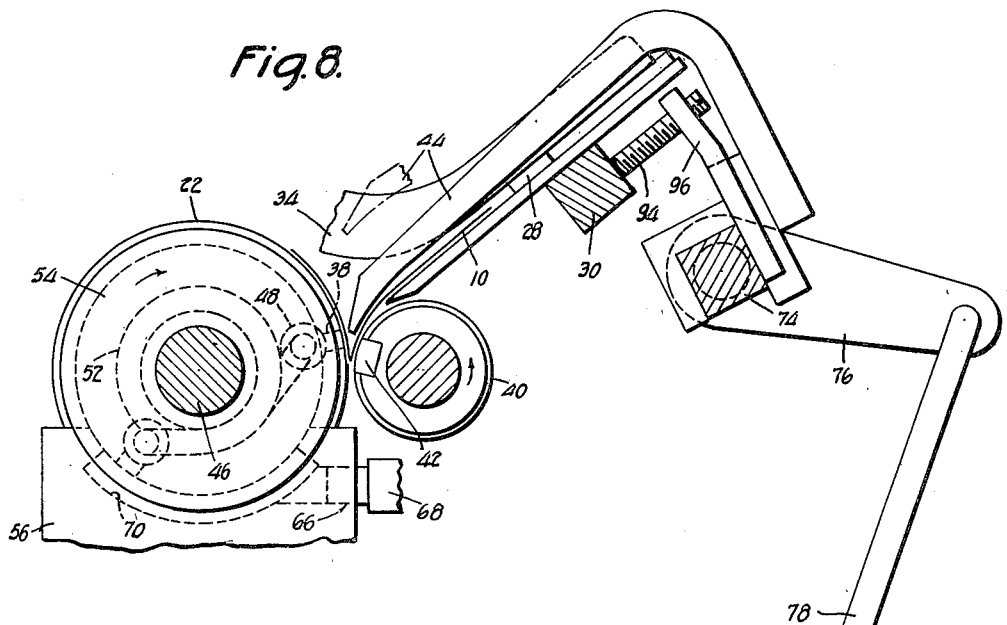
Fig. 8.
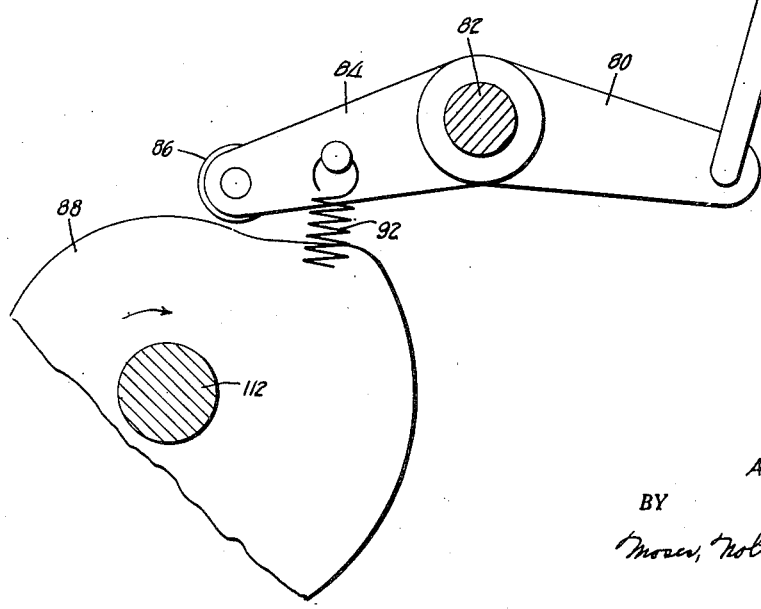
INVENTOR.
Abraham Novick
BY
Moser, Nolte, Crews + Berry
ATTORNEYS

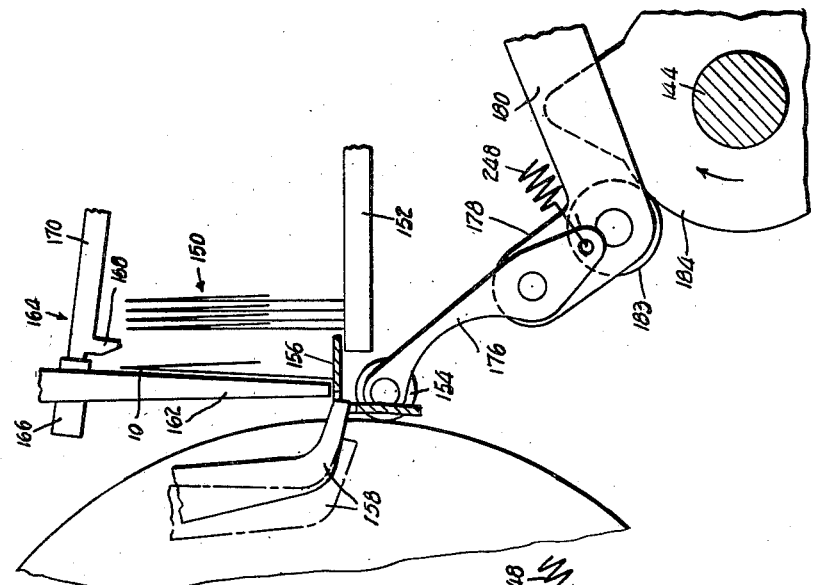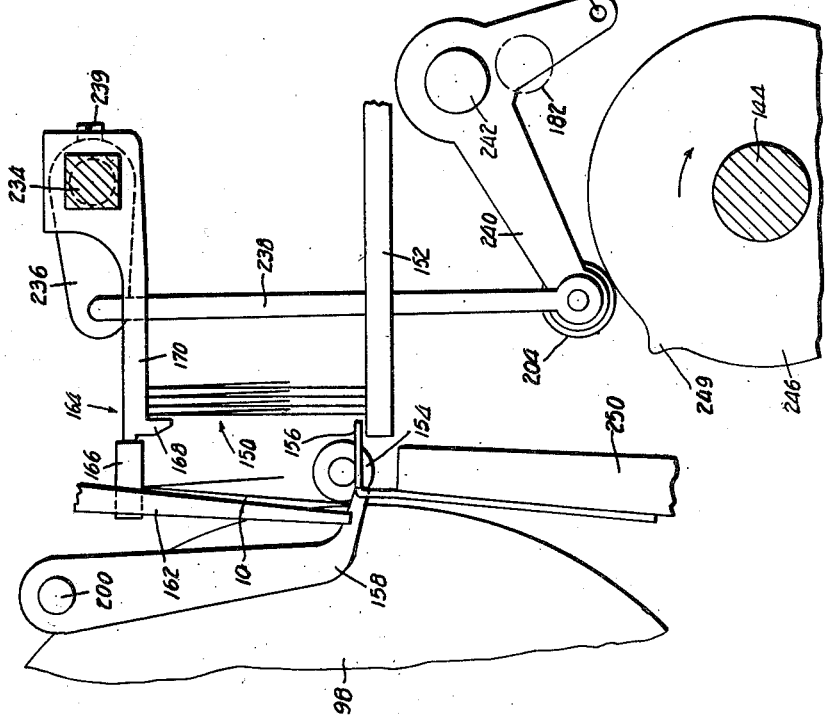

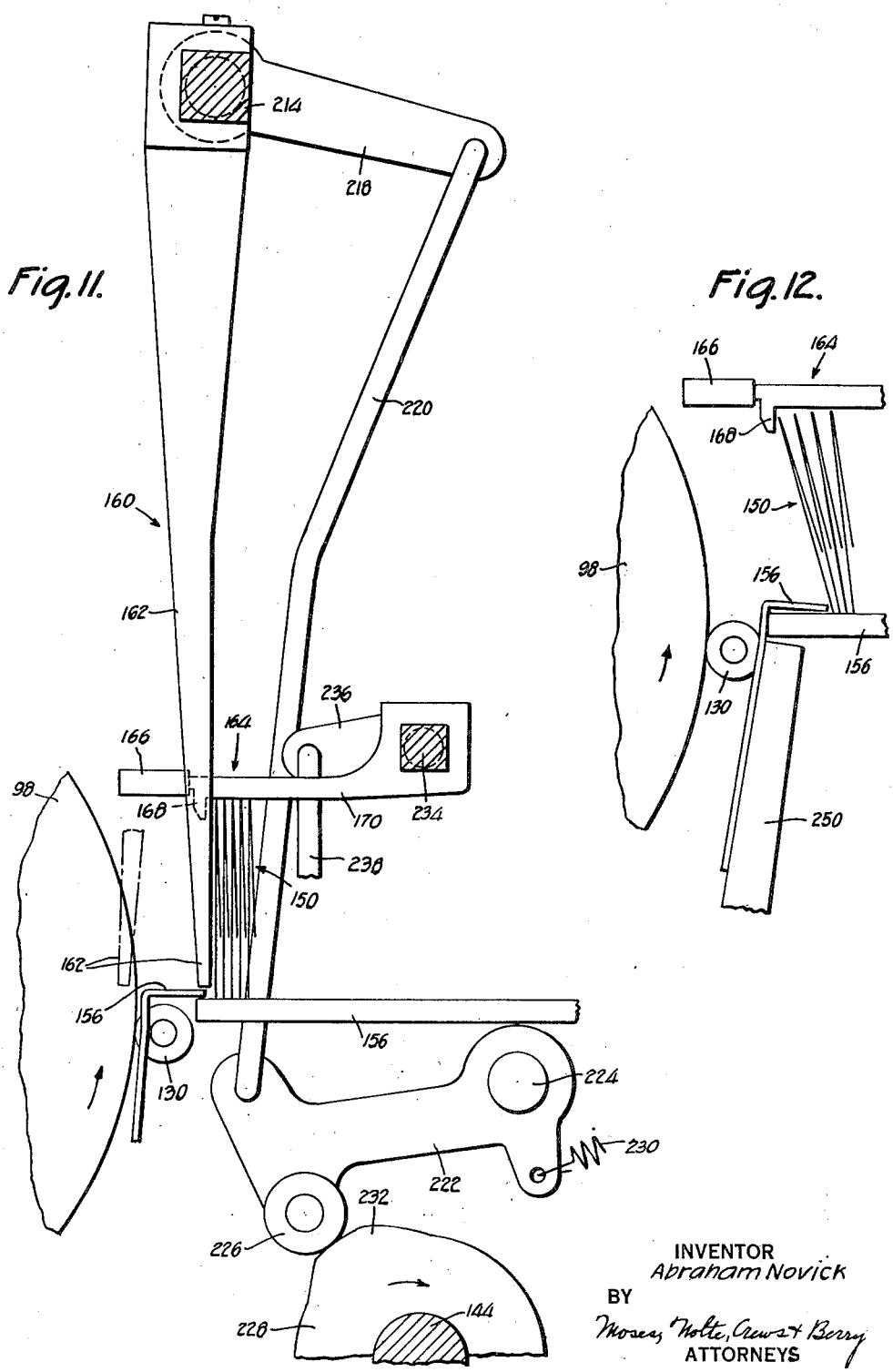

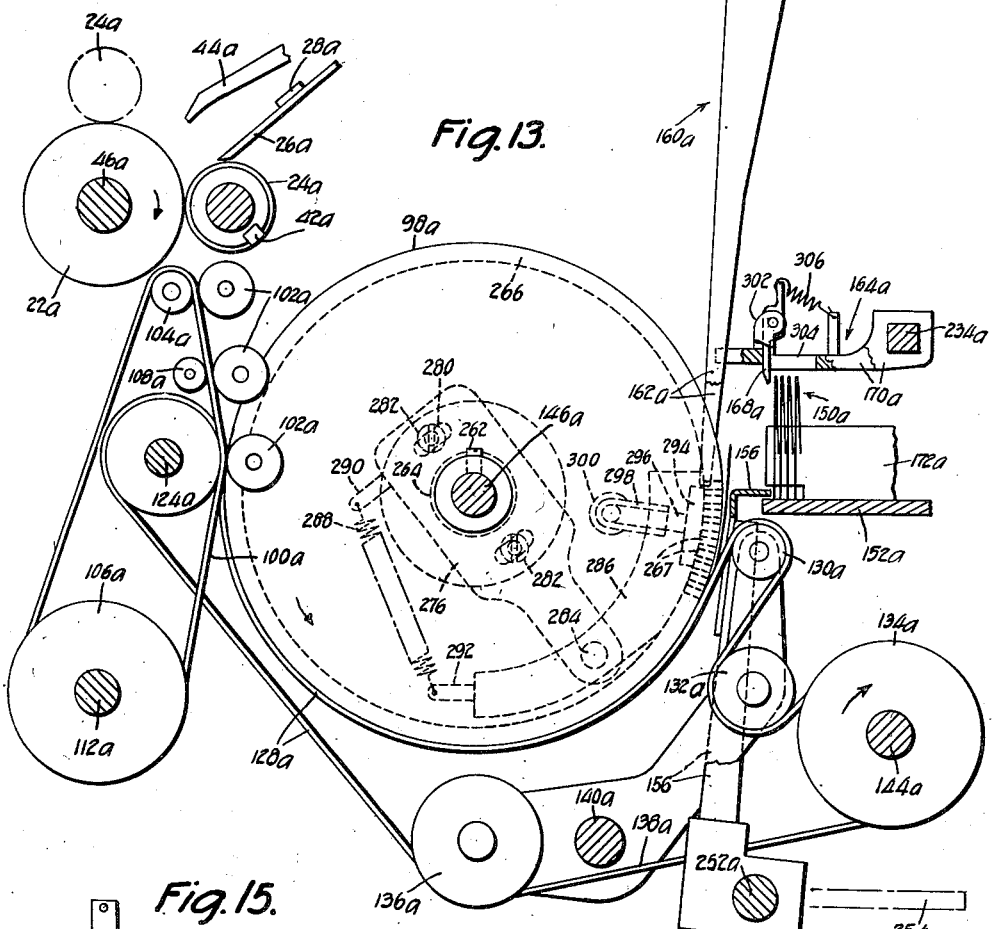

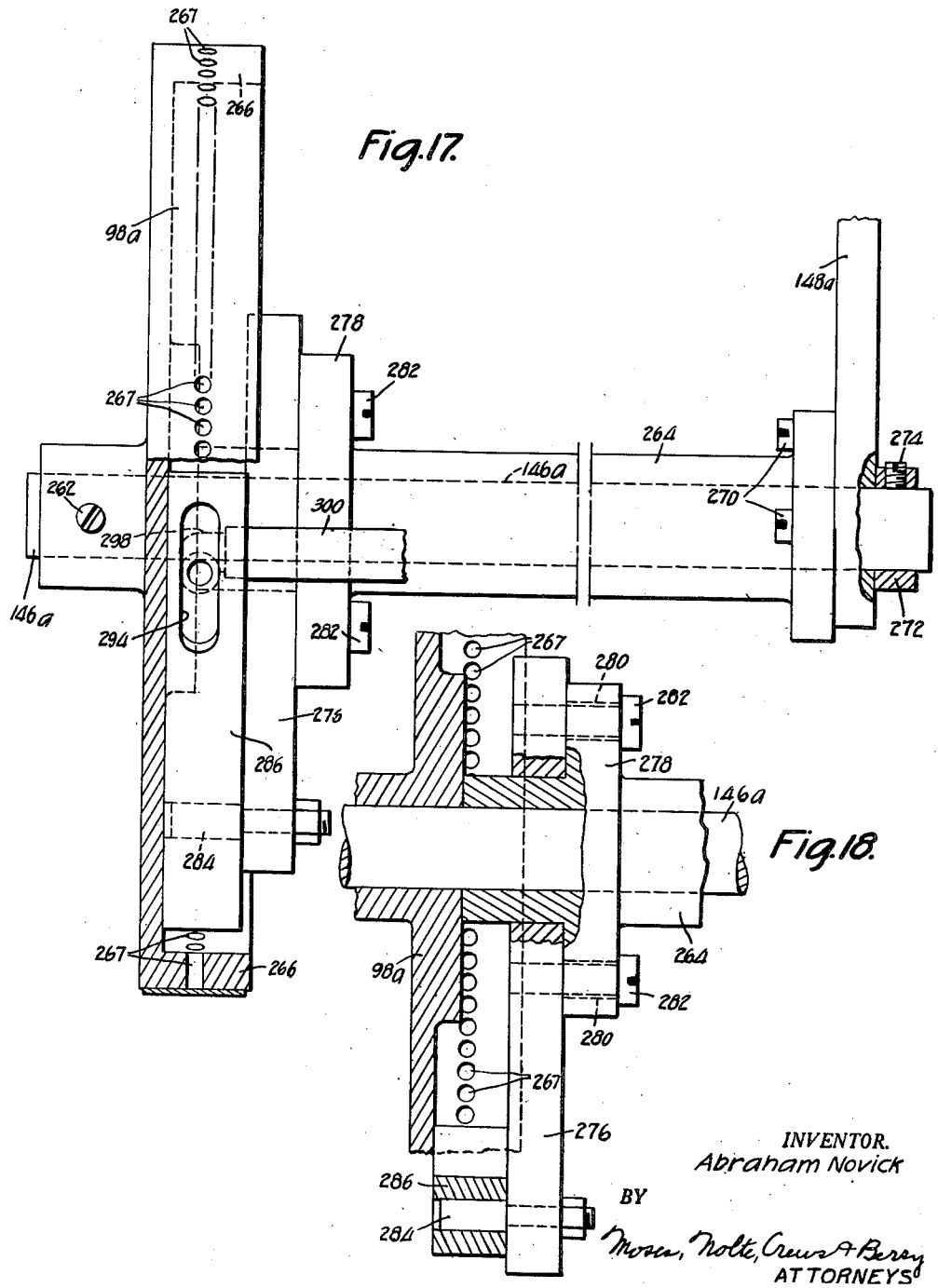

United States Patent Office 2,787,468
Patented Apr. 2, 1957

2,787,468

DELIVERY MECHANISM FOR ENVELOPE MAKING MACHINES

Abraham Novick, Flushing, N. Y., assignor to F. L. Smithe Machine Co., Inc., New York, N. Y., a corporation of New York Application April 25, 1956, Serial No. 580,571

11 Claims. (Cl. 271—87)

This invention relates to delivery mechanism for envelope making machines. In the manufacture of envelopes, it is usual for the finished envelopes to be advanced sequentially by a travelling or rotary conveyor to a transfer point at which the envelopes arrive while travelling in an upward direction and there to be added to an edge supported, accumulating stack of envelopes.

The transferring of the blanks into the accumulating stack is not free from difficulty. This has been particularly true when the machine is operated slowly. In such a case the envelope would not rise to the proper height, and would cause a jam-up.

It is the primary object of the present invention to provide the combination with belt and cylinder feeding means which cooperate to advance each envelope up toward, but not completely to, the transfer level, of means which positively carries, takes over control of each envelope and carries it upward to the proper transfer level, at which level means is provided to thrust the envelope across a support and add it to the stack.

It is the primary object of the present invention to provide simple, efficient, fast-acting and dependable transfer mechanism for assuring the orderly incorporation of the blanks into the stack as they arrive at the transfer point.

Other advantages and objects will hereinafter appear.

In the drawing, forming part of this specification:

Figure 8 is a fragmentary, detail view concerned chiefly with mechanism for folding in the flap of the envelope;

Figure 9 is a fragmentary detail view of the transfer mechanism on a comparatively large scale, showing the parts in the positions occupied by them at the beginning of the pushing of an envelope away from the transfer point;

Figure 10 is a view similar to Figure 9 but showing the parts with the envelope pushed part way over toward the stack;

Figure 11 is also similar to Figures 9 and 10 but shows the envelope pushed completely into engagement with the stack and held in place by the detents;

Figure 12 is a view similar to Figure 10, but shows the lower detent pushed over as it would be to help clear a jam;

Figure 13 is a fragmentary view in sectional side elevation showing another form of delivery mechanism embodying features of the invention;

Figure 14 is an enlarged fragmentary view partly broken away showing portions of a suction drum and a valve plate cooperative therewith;

Figure 15 is an end view of the combined jogger and upper detent of Figure 13;

Figure 16 is a plan view of the combined jogger and upper detent of Figure 13;

Figure 17 is a front view, partly broken away, showing the suction drum, associated valve mechanism and the supporting means therefor; and Figure 18 is a fragmentary sectional view of a portion of the structure illustrated in Figure 17.

Figure 1:
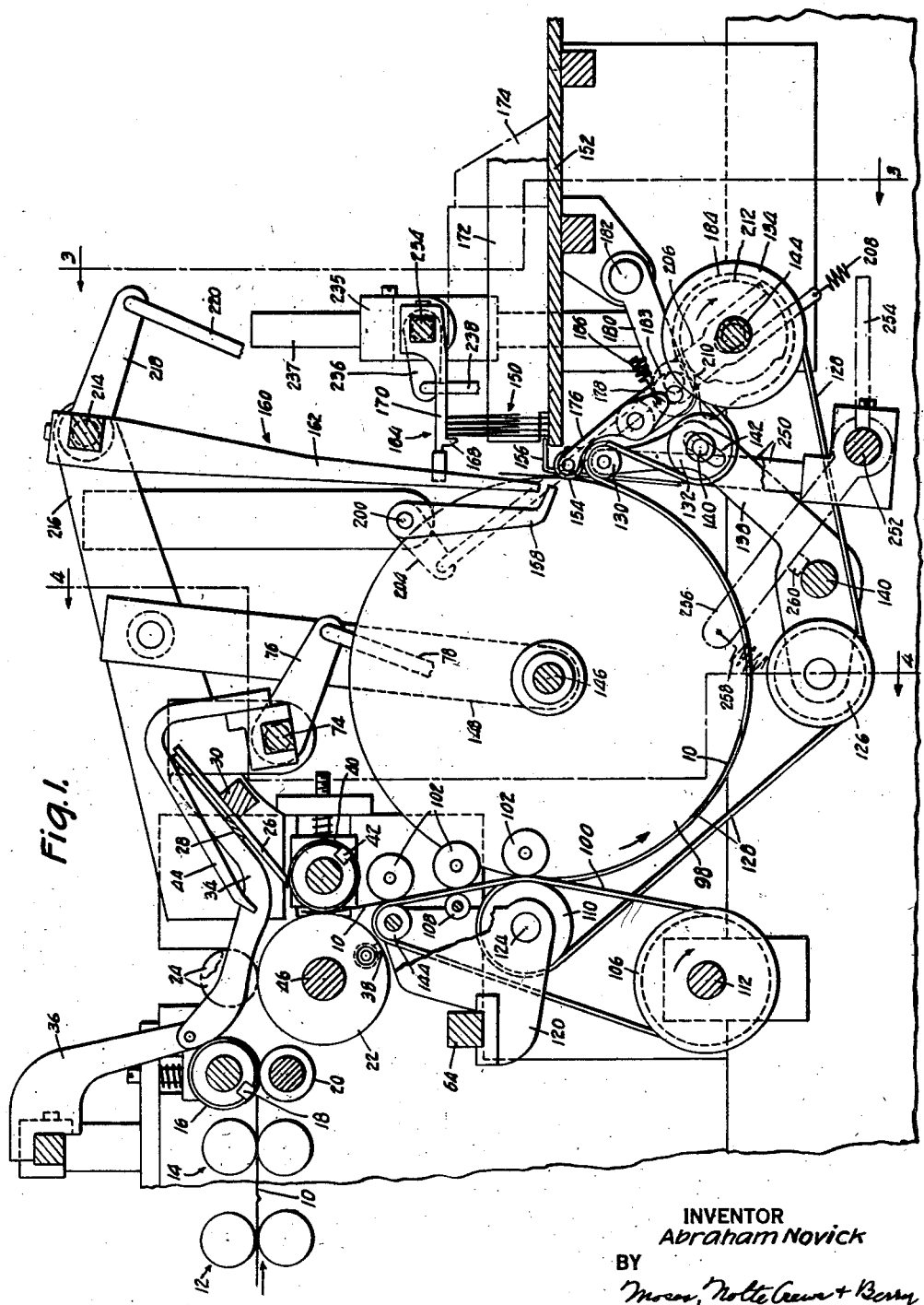
Figure 1 is a fragmentary view in sectional side elevation partly broken away, showing one form of delivery mechanism which embodies details of the invention, the section being taken on the line 1—1 of Figure 3 looking in the direction of the arrows.
Figure 2:
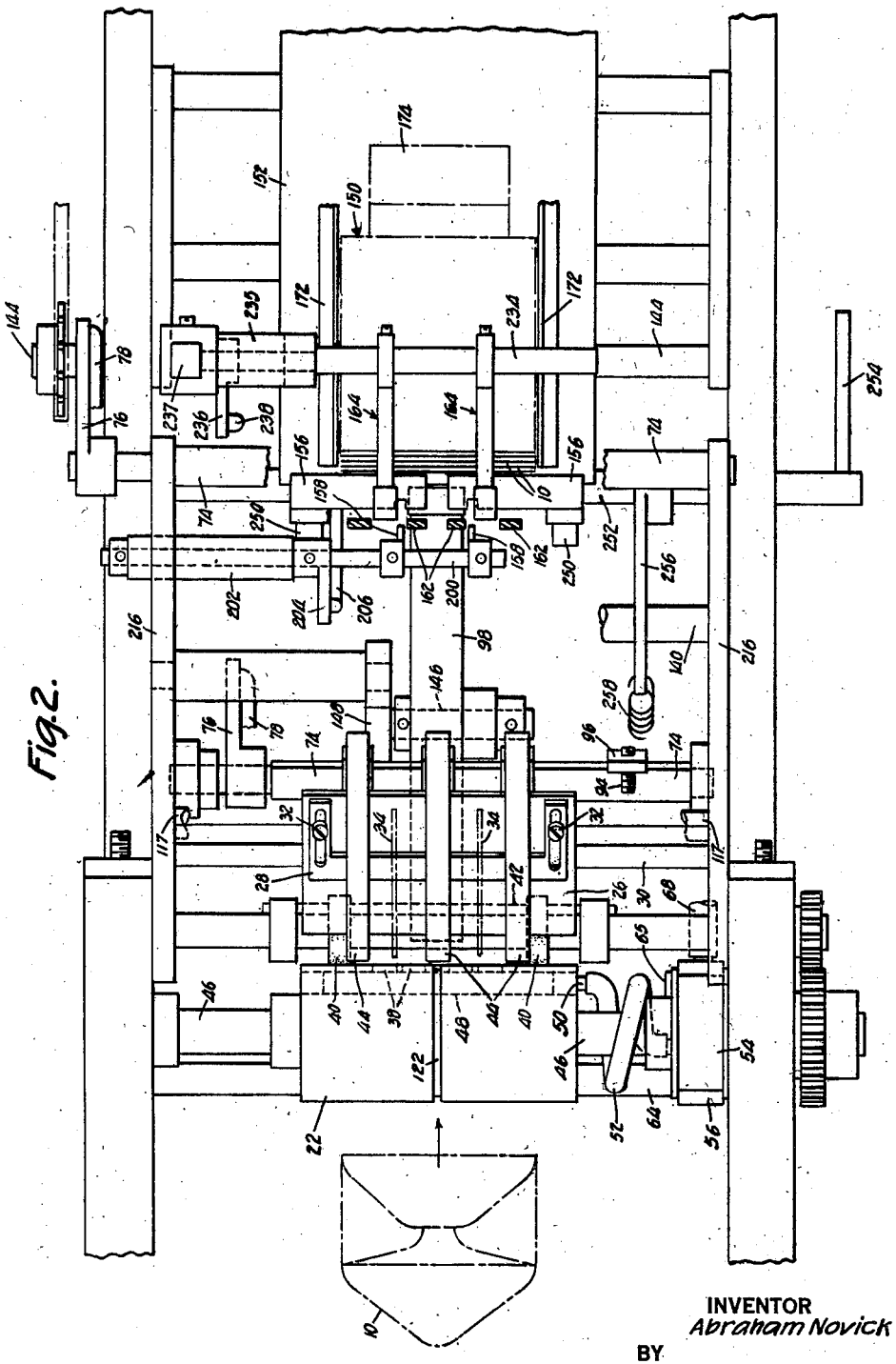
Figure 2 is a fragmentary plan view of the mechanism shown in Figure 1.
Figure 3:
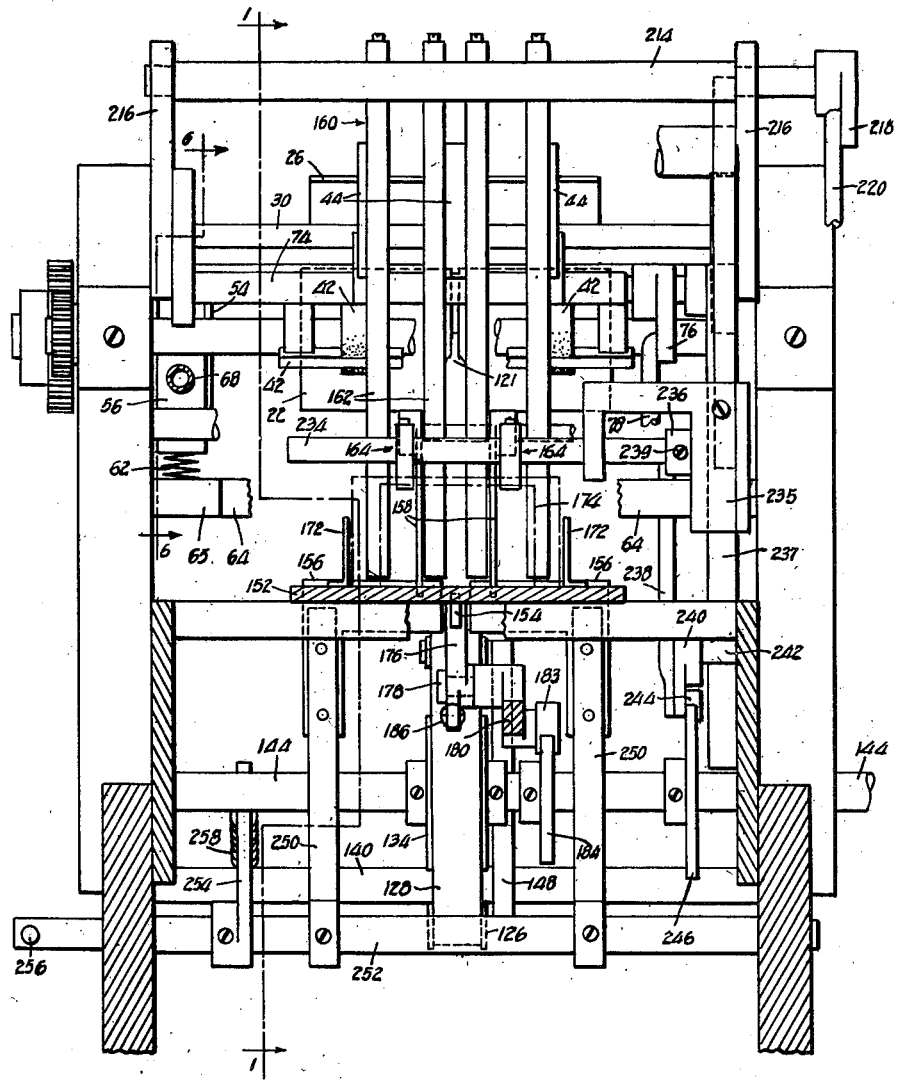
Figure 3 is a vertical sectional view taken along the line 3—3 of Figure 1 looking in the direction of the arrows.

The illustrative mechanism of Figs. 1 to 12 may be regarded as applied to a high speed wide range rotary envelope making machine which forwards the envelopes 10, complete except for the folding in of the sealing flaps, between opposed pairs of feed rollers 12 and 14. Each envelope is then passed between an upper spring pressed roller 16, having a bottom flap presser bar 18, and an opposed lower roller 20.

From the pressing couple 16—20 the envelope is fed, seal flap trailing, over a suction roller 22 and beneath opposed idler rollers 24. The suction roller 22 is driven at the rate of one revolution per cycle of the machine, and hence one envelope is delivered to the feed couple 22—24 at the same point in each revolution of the suction roller 22. The couple 22—24 acts on the envelope to drive the leading edge of the body against and along an upwardly inclined stationary shelf 26 (Figures 1 and 6) and against a stationary stop plate 28. The shelf 26 is affixed to a stationary frame bar 30. The stop plate 28 is slotted (Figure 2) and is secured by headed screws 32 to the shelf 26 with capacity for adjustment up and down the shelf, according to the height of the envelope body. During this movement, the envelope runs beneath guide bars 34, which are pivotally mounted at one end on stationary brackets 36 and rests by gravity at their opposite ends upon the stop plate 28.

Figure 6:
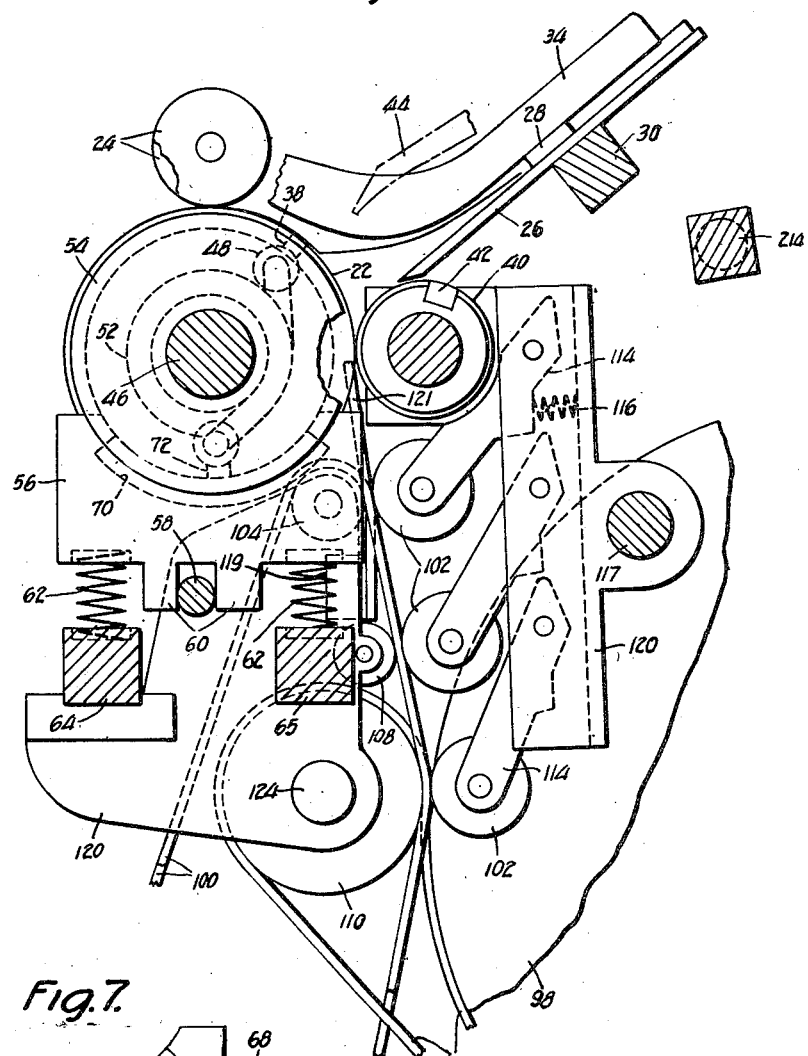
Figure 6 is a view in sectional elevation, the section being taken on the line 6—6 of Figure 3 looking in the direction of the arrows.
Figure 7:
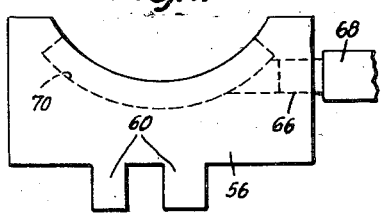
Figure 7 is a fragmentary detail view showing a suction transmitting and controlling valve block employed in the mechanism.

The suction roller 22 is adjusted in its timing so that the row of suction passages 38 (Figure 5) engages and holds the sealing flap from the body. The sealing flap is therefore held to the roller 22 and carried forward to a bight formed between the rollers 22 and an opposed spring pressed roller 40 which is equipped with a presser bar 42. The movement of the sealing flap toward the bight tends to fold the sealing flap relative to the body as shown in Fig. 6. In order to make sure, however, that the envelope will fold as intended, and that all portions of the fold at the junction of the sealing flap and the body will enter the bight at the same instant, a series of tucker fingers 44 is provided. The fingers move down as shown in Fig. 8 to tuck the fold accurately and squarely into the bight. The body and the sealing flap are then fed and pressed together between the roller 22 and the presser bar 42.

The suction roller 22 is secured upon a driven shaft 46 with capacity for rotative adjustment, the suction passages 38 being connected through a common bore 48, a nipple 50 and a flexible tube 52 with a rotary valve member 54 which is also adjustably made fast on the shaft 46. The flexible tube 52 is wrapped loosely around the shaft 46 with a considerable amount of slack present so that the roller 22 and the valve member 54 can be adjusted rotatively relative to the shaft and relative to one another without being limited by the tube. The valve member 54 is formed with a circumferential channel in a portion of which a stationary, floating valve block 56 is disposed. The block 56 is held against rotation by bar 58 which extends between fingers 60 of the block. The block 56 is pressed upward against the member 54 by springs 62 which bear against stationary recessed frame bars 64 and 65. The block 56 is connected through a nipple 66 (Figures 2 and 7) and a hose 68 with a suitable source of suction (not shown), so that a single recess 70 formed in the block is maintained constantly in communication with the source of suction. The valve member 54 is formed with a passage 72 which traverses the recess 70 once in each cycle. The passage 72 is in constant communication with the suction passages 38 and hence places the passages 38 in communication with the source of suction during the traverse of the recess 70 by the passage 72. The suction is cut off just as the passages 38 pass beyond the bight of the rollers 22—40.

The tucker fingers 44 are made fast upon a rock shaft 74. They are bent to extend around the shelf 26 and are made long enough to extend down nearly into the bight formed by the rollers 22—40 when the shaft 74 is rocked counter-clockwise to the position illustrated in Figure 8. The shaft 74 has fast upon it an operating arm 76 which is connected through a link 78 with a crank 80, fast on a rock shaft 82. A further arm 84, also fast on the shaft 82, carries a follower roller 86 for engagement with an actuating cam 88. The cam 88 is fast upon a shaft 90 which is driven at the rate of one revolution per cycle. The cam causes the fingers 44 to be carried back and forth in properly timed relation between the fully retracted position indicated in broken lines in Figure 8 and the fully advanced position indicated in full lines in that figure. In the fully retracted position, the tucking fingers stand farther away from the bight than the effective lower surface of the guide bar 34. As is apparent from an inspection of Figure 8, the cam 88 fast on a drive shaft 90, produces a retractive movement of the fingers 44, while a tension coil spring 92 connected at the opposite ends to the arm 84 and to a stationary frame part constantly urges the fingers in a forward direction. The forward limit of movement of the fingers 44 is determined and controlled by an adjustable stop screw 94. The screw is threaded through a finger 96 fixed to the shaft 74, and limits counter-clockwise turning of the shaft by engagement with the stationary bar 30.

From the roller bight 22—40 each envelope is conducted along a straight path to a large drum 98 by means of a pair of belts 100 and opposed presser rollers 102. The belts 100 run upon end rollers 104 and 106 and upon intermediate rollers 108 and 110. Rollers 106 are made fast upon a driven shaft 112 which drives the belt at a linear speed equal to the peripheral speed of the roller 22. The rollers 102 bear against the belts 100 opposite the rollers 104, 108 and 110, respectively. Each roller 102 is carried by an arm 114, pivoted on a fixed bracket 116, and is urged toward the associated belt by a compression coil spring 118. There are two brackets 116 one for each set of rollers 102 and the brackets 116 are supported on the inner ends of fixed rods 117 (Figure 4).

The rollers 104, 108 and 110 are mounted upon stationary brackets 120. The brackets 120 have affixed to them a bar 119 on which an upwardly extending stripper finger is mounted and whose upper end 121 (Figures 5 and 6) extends into a circumferential groove 122 of the roller 22.

Figure 4:
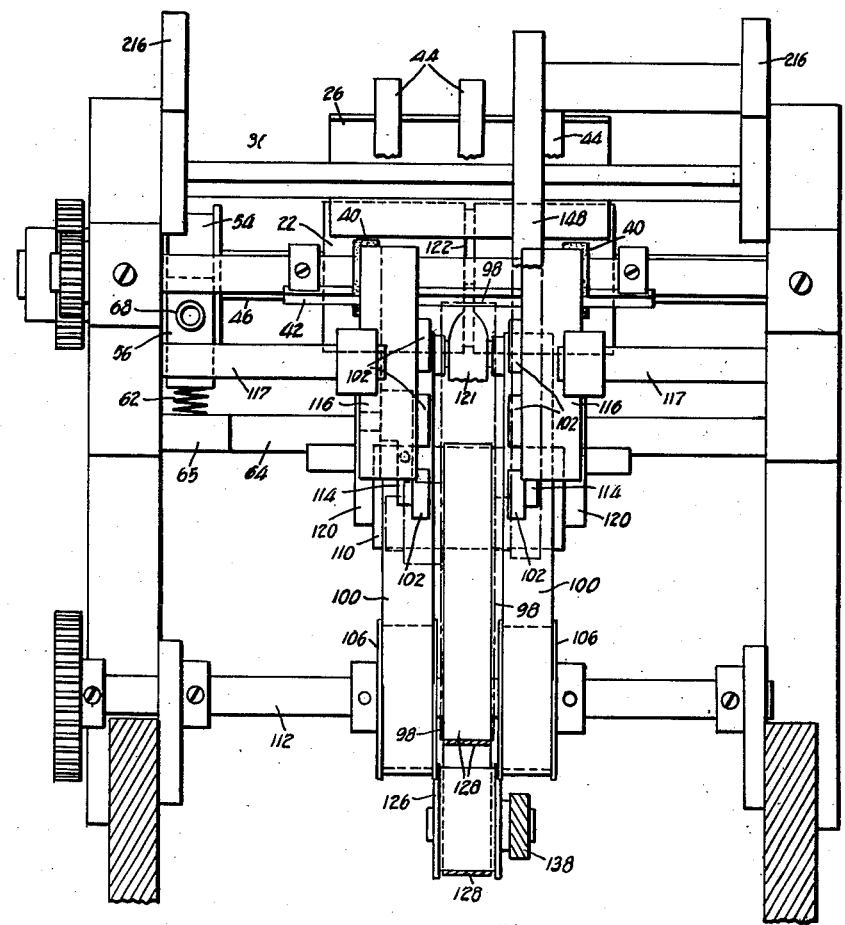
Figure 4 is a vertical sectional view taken along the line 4—4 of Figure 1 looking in the direction of the arrows.
Figure 5:
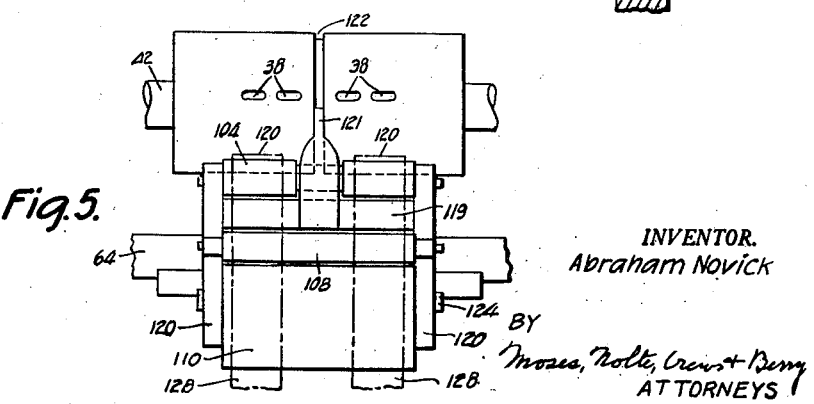
Figure 5 is a fragmentary detail view of a portion of the mechanism shown in Figure 1.

The belts 100 are disposed outside the lateral bounds of the drum 98 (Figure 4). A shaft 124, which is carried by the brackets 120 and which supports the roller 110, has mounted upon it, an end roller 126 of an endless belt 128. The belt 128 bears against the circumference of the drum 98 through substantially one half of its circumference. The belt 128 and the drum 98 take over control of each envelope from the belts 100 and the rollers 102. The belt 128 travels from roller 110 against the circumference of the drum 98 to an end roller 130. It passes successively around the roller 130 and around rollers 132, 134 and 136. The rollers 130, 132 and 136 are carried on a bracket 138, which bracket is affixed to a stationary supporting rod 140. The roller 132 is a belt tightening roller. It is revolubly carried on a stub shaft 140 which is adapted to be secured in any desired position along a slot 142 of a bracket 138. The roller 134 drives the belt, being made fast upon a driven shaft 144. The drum 98 is revolubly mounted upon a stationary shaft 146, which shaft is supported by a frame member 148. The drum is rotatively driven by the belt 128.

The shaft 144, besides driving the belt 128, drives a series of cams which control and operate various instrumentalities that enter into the transfer of the envelopes, one by one, from the drum 98 to a stack 150 on a stationary table 152. The belt 128 and the drum 98 carry each envelope forward until the trailing end of the envelope clears the feed bight between the belt and the drum at the roller 130. Beyond that point an auxiliary feed roller 154 bears against the drum for cooperation with the drum in continuing the advance of the envelope precisely to a desired transfer point at which the lower edge of the envelope stands a little above the top of the table 152, and high enough to clear a normally stationary lower detent ledge 156 which the envelope must cross in passing from the drum 98 to the stack 150. The roller 154 is made to advance around the drum as the envelope approaches the transfer point, and then to retreat quickly along the drum so as to leave a clear path for the envelopes between the drum and the stack.

As the envelope arrives substantially at the transfer point, lifter fingers 158 are swung in beneath the lower edge of the envelope, as in Figure 9, to prevent it from dropping back as the roller 154 retreats. As soon as the roller 154 is out of the way, a pusher 160 which comprises a series of fingers 162 swings forward to thrust the envelope from the transfer point into engagement with the stack 150. In this movement, the envelope travels over the detent ledge 156 and beneath a combined upper detent and jogger 164. The combined upper detent and jogger includes an end portion 166 which stands initially in obstructing relation to an envelope advanced by the drum 98 and the roller 154 in position to prevent overfeeding of the envelope in an upward direction. At the same time, a detent finger 168 extends down across the upper margin of the envelope last previously added to the stack to retain it in place, and the main body of the arm 170, which functions as a jogger, rests upon the upper side of the stack. As the pusher 160 swings forward to add a fresh envelope to the stack 150, the arm 170 is raised, as in Figure 10, carrying with it the finger 168, so that the upper portion of the envelopes can be pushed unobstructedly into engagement with the stack.

When the pusher has pushed the envelope forward past the finger 168 and the ledge 156, and before the pusher has retreated substantially, the arm 170 descends as in Figure 11. This has the effect of jogging the added envelope down against the table and in front of the detent 156. It also has the effect of returning the finger 168 into position to hold the upper margin of the just added envelope against retrograde movement. The pusher is then returned to the initial position, illustrated in Figure 1, with its fingers 162 crossing the circumference of the drum 98 along the sides of the drum. In this position, the fingers 162 serve as strippers for compelling each envelope to travel tangent to the drum as it approaches the transfer point and directly toward the stop portion 166 of the combined jogger and upper detent 164. Suitable side guides 172 for the stack are provided on the table 152 and the usual slidable weight 174 is provided for engaging the leading end of the accumulating stack.

The auxiliary roller 154 (Figures 1, 3 and 10) is carried at the upper end of a lever 176. The lever is pivoted at 178 on the upturned end of a bell-crank 180. The bell-crank 180 is supported on a stationary pivot or stub shaft 182 and carries a follower roller 183 which rides upon, and is controlled by a cam 184 fast on the shaft 144. A tension coil spring 186, connected between the tail of the lever 176 and a fixed part of the machine frame, urges the auxiliary roller toward the drum 98 at all times. Upward movement of the roller 154 is produced by a high part of the cam 184. The reverse movement is produced by a spring 188 which urges the follower toward the cam at all times. It will be evident from an examination of the cam (Figure 1) that the roller is held in its advanced position only briefly.

The lifter fingers 158 are made fast on a rock shaft 200 (Figures 1 and 2) which is carried by a fixed bracket 202. An arm 204, fast on the shaft 200, is connected to a forked pitman 206, whose lower end embraces the shaft 144 and is pulled downward by a spring 208. The pitman 206 carries a follower roller 210 which rides upon a cam 212 affixed to the shaft 144. The high part of the cam 212, as shown in Figure 1, holds the lifter fingers in their retracted positions, clear of the path along which the envelopes are advanced by the drum 98. As previously mentioned, the lifter fingers are advanced (to the Figure 9 position) just as the envelope arrives at the transfer point. They are retained in that position until the pusher has advanced through a substantial part of its forward stroke, but are returned to the retracted position in ample time to leave a clear path for the next envelope carried forward by the drum.

The pusher fingers 162 are made fast upon a rock shaft 214 (Figures 1, 3 and 11) which is carried by stationary brackets 216. An operating arm 218, fast on the shaft 214, is connected to the upper end of link 220. The link 220 is connected at its lower end to a rocker arm 222 which is rockably supported on a stationary shaft 224. The rocker arm 222 carries a follower roller 226 which bears against a cam 228 fast on the shaft 144. A spring 230, connected to the tail of the rocker arm 222 and to a fixed part of the machine, maintains the rocker arm in engagement with the cam. As seen in Figure 11, a high part 232 of the cam is under the follower 226 holding the pusher fingers at their forward limit of movement. It will be noted that the high part 232 has a flat top adapted to provide a dwell of the pusher fingers at their forward limit of sufficient duration to assure correct functioning of the combined jogger and detent 164 while the fingers 162 remain fully advanced and at rest. The total angular extent of the high part of the cam is not very great, however, so that the fingers are maintained in their normal retracted positions throughout the major part of the cycle (as shown about five-sixths of the cycle).

The operating means for the combined jogger and upper detent 164 is best shown in Figure 9. The jogger arms 170 are made fast on a rock shaft 234 which also has fast upon it an operating arm 236. The arm 236 is connected through a link 238 with a rocker arm 240. The shaft is supported in a bracket 235 vertically adjustable on a fixed post 237. The arm 236 is angularly adjustable on the shaft 234, being secured thereto by a set screw 239. The arm 240, which is mounted on a stationary stub shaft 242, carries a follower roller 244 which bears against a cam 246, fast on the shaft 144. A spring 248 acts on the arm 240 to maintain the follower 244 in engagement with the cam 246. The cam 246 is generally circular in form but is provided with a single high part 249 of limited extent. As the faces of the pusher fingers near the plane of the detent fingers 168, the arms 170 are swung sharply upward and then almost immediately permitted to return to their normal position, but only after the envelope has been carried forward beyond the detent fingers 168.

While the mechanism described is intended to handle the envelopes in definitely timed relation and to add them sequentially to the stack under definite control in the manner described, there is an occasional malfunctioning with consequent jams at the transfer station. When a jam occurs, it is important to clear the transfer station of the obstruction as quickly as possible because the envelopes are delivered at high speed and quickly pile up. For this purpose, the detent ledge 156, which stands just a little above the level of the table, and which is intended normally to occupy a fixed position, is constructed and arranged so that it can be conveniently moved forward to provide extra clearance for the blanks at the lower edge of the stack. By stopping the machine, giving the detent ledge an actuation toward the right (Fig. 12), and then withdrawing laterally any envelopes that are jammed it is possible promptly to clear up most jams that occur.

Each detent 156 consists of a piece of sheet metal having a narrow, vertically disposed body and a wide horizontally disposed end flange, the latter constituting the ledge. The body portion is attached to a rocker arm 250 with the horizontal flange spaced from the end of the arm by more than the thickness of the table 152 (as seen in Figure 12). The arm 250, as seen in Figure 1, is made fast upon a rock shaft 252, to which an operating handle 254 is applied. A further arm 256 fast on the shaft 252 is urged by a spring 258 in a counter-clockwise direction (Figure 1) to pull the detent 156 toward its normal, non-actuated position. An adjustable stop 260, carried by the tail arm 256 and engageable with the stationary shaft 140, determines the novel position of the detent 156.

In Figures 13 to 18 disclosure is made of another illustrative mechanism embodying features of the invention. The mechanism is in many respects like that of Figures 1 to 12, and differs chiefly in that the drum 98a is a suction drum, and that the roller 154 and the lifter fingers 158, with their operating mechanisms, are omitted. Parts which are unchanged as compared with Figures 1 to 12 have been given corresponding reference characters with the subscript a added in each instance and the description will be confined substantially to the points of difference.

The envelopes are fed in as before between rollers 22a and 24a onto a shelf 26a and against a stop plate 28a. Tucker fingers 44a act to tuck the envelopes into the bight 22a—40a. As before, the envelopes are driven downward between belts 100a and rollers 102a to drum 98a and belt 128a. As before, the belt 128a is driven by roller 134a on shaft 144a and, in turn, drives the drum 98a.

As best seen in Figure 17, the drum 98a is in the form of a flanged wheel, the flange 266 being provided at frequent angular intervals with suction passages 267 throughout its entire circumference. The suction drum 98a is designed to continue the positive advance of each envelope by suction, after it leaves contact with the belt 128a, to precisely the transfer point at which the pusher engages it to move it away from the drum and toward the stack. The provision of suction as illustrated obviates the need for the auxiliary roller 154 and the supporting fingers 158 of the mechanism of Figures 1 to 12. This latter form of mechanism is more dependable than that of Figs. 1 to 12, because an envelope once raised to the transfer level never slips back.

In this instance, the drum 98a is secured upon the shaft 146a by suitable means, such as a set screw 262 threaded through its hub. The shaft extends through a flanged spacing and bearing sleeve 264. The bearing sleeve engages the drum 98a at one of its ends and at the other end engages a supporting frame member 148a. A flange 268 of the sleeve 264 is affixed to the frame member 148a by screws 270. The shaft 146a extends through the frame member 266 and is held against axial movement by a collar 272 which is held to the shaft by a set screw 274.

A bracket 276 (Figures 16 to 18) is mounted on the sleeve 264 with capacity for limited rotative adjustment. The bracket surrounds the shaft 146a and bears against the left face of the sleeve flange 278, as seen in Figure 18. The flange 278 is formed with arcuate slots 280. Headed screws 282 have their shanks passed through the slots 280 and threaded into the bracket 276. When the screws are backed out part way, the bracket 276 is freed for rotative adjustment within the limits prescribed by the lengths of the slots 280. A tightening of the screws secures the brackets in the position to which it has been adjusted.

The bracket 276 extends radially outward nearly to the flange 266 of the drum 98a and provides near its outer end a pin 284 upon which a suction shoe 286 is pivotally mounted. A tension coil spring 288, connected between pins 290 and 292 on the bracket 276 and the tail of the shoe 286, respectively, urges the tail of the shoe inward and causes the forward or active end of the shoe to be pressed yieldingly outward at all times against the inner surface of the flange of the flange 266 of the drum 98a.

The forward end of the shoe 286 is formed in its outer face with a suction pocket or recess 294 which is traversed by the suction openings 267 of the drum. Each opening has suction applied to it so long as it is in communication with (travelling across) the suction recess 294. The recess 294 is maintained constantly in communication with a source of suction (not shown) through a radial bore 296, an elbow 298, and a flexible suction hose 300. The suction becomes effective early enough to cause the drum to assume the role of a suction feeder while the envelope is still gripped between the drum 98a and the belt 128a. It is important that the drum continue to carry the envelope forward by suction after the trailing edge of the envelope has passed free of the belt 128a. By adjusting the bracket forward or backward, a position of adjustment may be chosen which will cause the blank to be freed of the suction hold of the drum precisely as it reaches the transfer point at which the pusher fingers will start to push it towards the stack. The suction drum has the advantage over the auxiliary roller 154 that it interposes no obstruction to the thrusting of the envelope toward the stack immediately upon the arrival of the envelope at the transfer point. The pusher is accordingly timed to act so promptly that there is no time for the envelope to drop backwards. It is for this reason that the supporting fingers 158 of the Figures 1 to 12 mechanism may be dispensed with.

The combined joggers and upper detents 164a are provided and operated as before, but in this instance each upper detent finger 168a, instead of being unitary with the arm 170a and rigid, is pivotally mounted on an ear 302 of the arm and extends downward through a slot 304 of the arm. A tension coil spring 306 connected to the tail of the detent finger 168a and to a finger 308 on the arm 170a maintains the finger 168a normally in engagement with the left hand boundary of the slot 304. This mounting of the finger 168a has the advantage that if an envelope in moving toward the stack should strike the finger 168a the finger may yield, permitting the envelope to pass, and may then be restored to its normal position by the action of the spring 306.

I have described what I believe to be the best embodiments of my invention. I do not wish, however, to be confined to the embodiments shown, but what I desire to cover by Letters Patent is set forth in the appended claims.

What is claimed is:

1. A delivery mechanism for envelope making machines comprising, in combination, a stack supporting table for receiving the finished envelopes and accumulating them on edge in stack formation, a travelling feeder for receiving the finished envelopes as they are delivered in timed relation by the machine and for advancing them sequentially, each in an upward direction toward a transfer point at which it stands above the level of the table, said travelling feeder including a rotary drum and a feed belt opposed thereto, the belt being disposed to yield control of each envelope shortly before the transfer point is reached, means causing the drum to continue the positive advancing of the finished envelopes sequentially in an upward direction to the transfer point at which each envelope stands above the level of the table, and there to yield up control of the envelope, a reciprocable pusher operative to engage each envelope as it arrives at the transfer point and thrust it away from the transfer point and into engagement with the stack, a reciprocable envelope detent engageable with an upper edge of the envelope last added to the stack, and lower detent means for preventing retrograde movement of the lower portion of the envelope after it has been added to the stack.

2. A delivery mechanism for envelope making machines comprising, in combination, a stack supporting table for receiving the finished envelopes and accumulating them on edge in stack formation, a travelling feeder for receiving the finished envelopes as they are delivered in timed relation by the machine and for advancing them sequentially, each in an upward direction toward a transfer point at which it stands above the level of the table, said travelling feeder including a rotary drum and a feed belt opposed thereto, the belt being disposed to yield control of each envelope shortly before the transfer point is reached, means causing the drum to continue the advancing of the finished envelopes sequentially in an upward direction to the transfer point at which each envelope stands above the level of the table, and there to yield up control of the envelope, a reciprocable pusher operative to engage each envelope as it arrives at the transfer point and thrust it into engagement with the stack, a reciprocable envelope detent engageable with an upper edge of the envelope last added to the stack, means for operating the detent in time with the pusher to clear the stack as the pusher nears the stack and to reengage the stack while the pusher is substantially at the limit of its forward movement, and a normally stationary lower stack detent disposed a little above the table top, across which the envelopes are thrust by the pusher.

3. A delivery mechanism for envelope making machines comprising, in combination, a stack supporting table for receiving the finished envelopes and accumulating them on edge in stack formation, a travelling feeder for receiving the finished envelopes as they are delivered in timed relation by the machine and for advancing them sequentially, each in an upward direction toward a transfer point at which it stands above the level of the table, said travelling feeder including a rotary drum and a feed belt opposed thereto, the belt being disposed to yield control of each envelope shortly before the transfer point is reached, means causing the drum to continue the advancing of the finished envelopes sequentially in an upward direction to the transfer point at which each envelope stands above the level of the table, and there to yield up control of the envelope, a reciprocable pusher operative to engage each envelope as it arrives at the transfer point and thrust it into engagement with the stack, a reciprocable envelope detent engageable with an upper edge of the envelope last added to the stack, and means for operating the detent in time with the pusher to clear the stack as the pusher nears the stack and to reengage the stack while the pusher is substantially at the limit of its forward movement, and a normally stationary lower stack detent disposed a little above the table top, across which the envelopes are thrust by the pusher, the lower detent being movably mounted, means yieldingly maintaining the lower detent in normal position, and means for actuating the lower detent to thrust the lower part of the stack forward in order to provide clearance when a jam occurs.

4. A delivery mechanism for envelope making machines comprising, in combination, a stack supporting table for receiving the finished envelopes and accumulating them on edge in stack formation, a travelling feeder for receiving the finished envelopes as they are delivered in timed relation by the machine and for advancing them sequentially, each in an upward direction toward a transfer point at which it stands above the level of the table, said travelling feeder including a rotary drum and a feed belt opposed thereto, the belt being disposed to yield control of each envelope shortly before the transfer point is reached, means causing the drum to continue the advancing of the finished envelopes sequentially in an upward direction, each to the transfer point at which it stands above the level of the table, and there to yield up control of the envelope, a reciprocatory pusher operative to engage each envelope at the transfer point and to thrust it into engagement with the stack on the table, a stationary lower detent disposed at the introductory end of the table to stand slightly above the table level in position to have each blank pushed across it to the stack, an opposed reciprocating jogger and upper detent, and means for operating the jogger and upper detent in time with the pusher, to move it upward away from the stack as the pusher approaches the stack and to move it downward while the pusher is substantially at its forward limit of movement, to jog the envelope downward against the table and in position to be held by the lower detent, and to engage behind the upper margin of the added envelope for holding the upper part of the envelope against retrograde movement as the pusher retreats.

5. A delivery mechanism for envelope making machines comprising, in combination, a stack supporting table for receiving the finished envelopes and accumulating them on edge in stack formation, a travelling feeder for receiving the finished envelopes as they are delivered in timed relation by the machine and for advancing them sequentially, each in an upward direction toward a transfer point at which it stands above the level of the table, said travelling feeder including a rotary drum and a feed belt opposed thereto, the belt being disposed to yield control of each envelope shortly before the transfer point is reached, means causing the drum to continue the advancing of the finished envelopes sequentially in an upward direction to the transfer point at which each envelope stands above the level of the table, and there to yield up control of the envelope, a reciprocable pusher operative to engage each envelope as it arrives at the transfer point and thrust it into engagement with the stack, a reciprocable envelope detent engageable with an upper edge of the envelope last added to the stack, and means for operating the detent in time with the pusher to clear the stack as the pusher nears the stack and to reengage the stack while the pusher is substantially at the limit of its forward movement, the pusher being disposed to serve as a stripper when the drum and an envelope tend to cling to one another, as the envelope is being advanced toward the transfer point.

6. A delivery mechanism for envelope making machines comprising, in combination, a stack supporting table for receiving the finished envelopes and accumulating them on edge in stack formation, a travelling feeder for receiving the finished envelopes as they are delivered in timed relation by the machine for advancing them sequentially, each in an upward direction toward a transfer point at which it stands above the level of the table, said travelling feeder including a rotary drum and a feed belt opposed thereto, the belt being disposed to yield control of each envelope shortly before the transfer point is reached, means causing the drum to continue the advancing of the finished envelopes sequentially in an upward direction, each to the transfer point at which it stands above the level of the table, and there to yield up control of the envelope, a reciprocatory pusher operative to engage each envelope at the transfer point and to thrust it into engagement with the stack on the table, a stationary lower detent disposed at the introductory end of the table to stand slightly above the table level in position to have each envelope pushed across it to the stack, an opposed reciprocating jogger and upper detent, and means for operating the jogger and upper detent in time with the pusher, to move it upward away from the stack as the pusher approaches the stack and to move it downward while the pusher is substantially at its forward limit of movement, to jog the envelope downward against the table and in position to be held by the lower detent, and to engage behind the upper margin of the added envelope for holding the upper part of the envelope against retrograde movement as the pusher retreats, the pusher being disposed to serve as a stripper when the drum and an envelope tend to cling to one another, as the envelope is being advanced toward the transfer point, and the combined jogger and upper detent being disposed at the same time to serve as an intercepting stop for the advancing envelope.

7. A delivery mechanism for envelope making machines comprising, in combination, a stack supporting table for receiving the finished envelopes and accumulating them on edge in stack formation, a travelling feeder for advancing the finished envelopes sequentially, each in an upward direction toward a transfer point at which it stands above the level of the table, an auxiliary feed roller cooperative with said travelling feeder in the final advance of each envelope by the feeder, means for advancing the auxiliary roller along the feeder to assure release of the envelope for transfer at an appropriate level and for then retracting the auxiliary roller along the feeder to leave a clear path of movement for the envelope toward the stack, a reciprocable support movable beneath the lower edge of each envelope to maintain the lower edge clear of obstruction in its movement toward the stack, a reciprocable pusher apparatus to engage each envelope and thrust it into engagement with the stack, a reciprocable envelope detent engageable with an upper edge of the stack, and means for operating the detent in time with the pusher to clear the stack as the pusher nears the stack and to reengage the stack while the pusher is substantially at the forward limit of its movement.

8. A delivery mechanism for an envelope making machine comprising, in combination, a stack supporting table for receiving the finished envelopes and accumulating them on edge in stack formation, a travelling feeder for receiving the finished envelopes as they are delivered in timed relation and advancing them sequentially, each in an upward direction to a transfer point at which it stands above the level of the table, said travelling feeder including a rotary drum and a feed belt opposed thereto, the belt being disposed to yield control of an envelope shortly before the transfer point is reached, an auxiliary feed roller cooperative with said drum in the final advance of each envelope by the drum, means for advancing the auxiliary roller along the drum as the envelope approaches the transfer point to assure the continued carrying upward of the envelope to an appropriate level for transfer and for then retracting the auxiliary roller along the drum to leave a clear path of movement for the envelope toward the stack, a reciprocable support movable beneath the lower edge of each envelope as it arrives at the transfer point, to maintain the lower margin of the envelope clear of obstruction in its movement toward the stack, a reciprocable pusher operative to engage each envelope and thrust it into engagement with the stack, and detent means acting in time with the pusher for detaining each blank added to the stack in a position substantially removed from the transfer point.

9. A delivery mechanism for an envelope making machine comprising, in combination, a stack supporting table for receiving the envelopes and accumulating them on edge in stack formation, a travelling feeder for receiving the finished envelopes as they are delivered in timed relation by the machine for advancing them sequentially, each in an upward direction toward a transfer point at which it stands above the level of the table, said travelling feeder including a rotary drum and a feed belt opposed thereto, the belt being disposed to yield control of each envelope shortly before the transfer point is reached, driving means for the belt, the drum being arranged to be driven by the belt, and consisting of a flanged wheel having suction openings provided through the flange at frequent angular intervals throughout the entire periphery of the wheel, means for supply suction to the drum openings in the region leading to the transfer point, comprising a stationary suction transmitting valve plate engaged with the inner face of the flange, the arrangement being such that the drum will carry each envelope to the transfer point after the belt has yielded up control of the envelope, a reciprocatory pusher for pushing each envelope as it arrives at the transfer point, away from the drum and into engagement with the stack, and detent means for preventing retrograde movement of the envelope after it has been added to the stack.

10. A delivery mechanism as set forth in claim 9 in which means is provided for yieldingly maintaining the valve plate pressed against the flange.

11. A delivery mechanism as set forth in claim 9 in which means is provided for yieldingly maintaining the valve plate pressed against the flange, and means is provided for adjusting the valve plate about the axis of the drum to locate the point of suction cut-off at precisely the transfer point desired.

References Cited in the file of this patent

UNITED STATES PATENTS

| 726,161 | Harris | Apr. 21, 1903 |

FOREIGN PATENTS

| 548,463 | Germany | Apr. 13, 1932 |
| 176,743 | Austria | Nov. 25, 1953 |